Sept. 18, 1962 L. G. LAKIN 3,054,163
ROLLER
Filed July 11, 1960
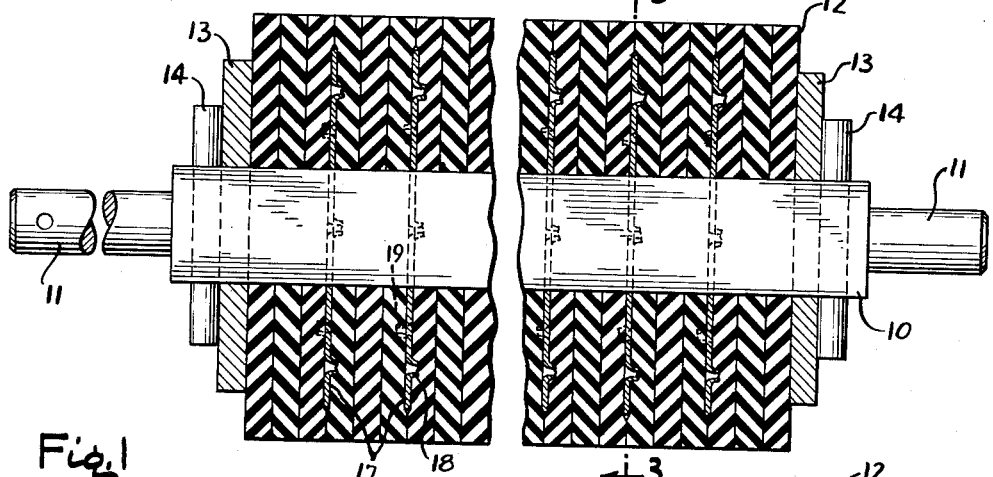
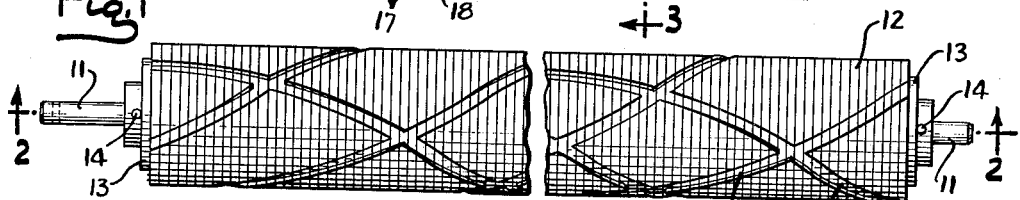
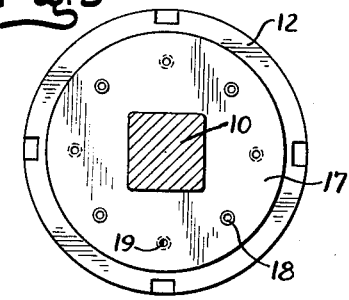
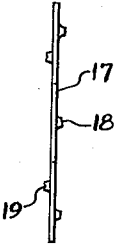
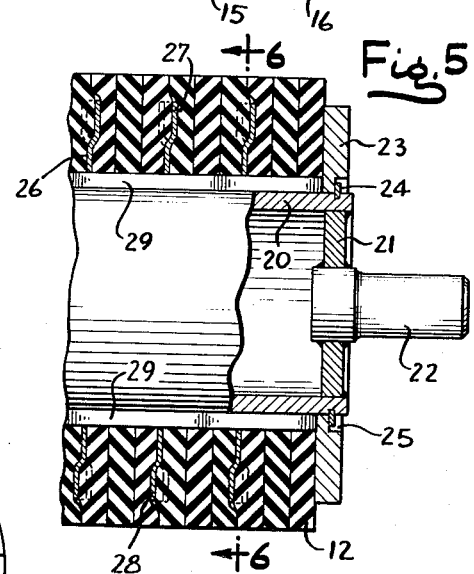
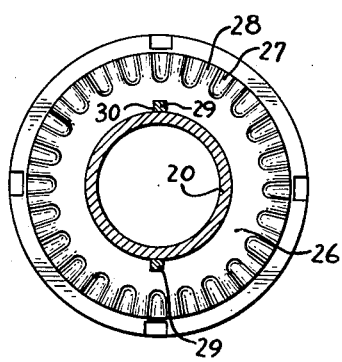
INVENTOR.
LEWIS G. LAKIN
BY
Gary, Desmond & Parker
ATTYS.

United States Patent Office 3,054,163
Patented Sept. 18, 1962

3,054,163
ROLLER
Lewis G. Lakin, Chicago, Ill., assignor to A. Lakin & Sons, Inc., Chicago, Ill., a corporation of Illinois
Filed July 11, 1960, Ser. No. 41,996
3 Claims. (Cl. 29—125)

This invention relates to improvements in rollers of the class which is comprised of a plurality of axially apertured discs of fabric-reinforced, flexible, resilient rubber mounted on an elongated shaft and under axial compression.

Rollers of this nature are suitable for a wide variety of uses, depending on their length and diameter, and may be used singly or in pairs in combination with like rollers or with relatively rigid metal rollers, in fixed or mobile installations.

Typical uses of the rollers herein contemplated are hay conditioner rolls, husking rolls, bale ejector rolls, leveling rollers, pulley drive and idler rolls, caster and other wheels, lawn mower rolls, and the like.

Further, the assembled discs forming the laminated roller may present a cylindrical or crowned contour; they may be formed with one or more over-all helical grooves, extending generally longitudinally of the roll; or the individual discs may be scalloped with adjacent discs arranged so as to present a helical or other pattern; or the adjacent scalloped discs may be alternately positioned, as is well known in the prior art.

As is also well known, the discs employed in making rollers of the class herein contemplated are for economical reasons generally formed of used fabric-reinforced rubber compositions, such as belting and particularly tire casings.

In the use of rollers of the class herein contemplated wherein, for example, hay crusher roller assemblies may be on the order of from about 5–8 inches in diameter with each disc of a thickness of about ¼–½ inch on shafts which may be 4–8 feet long, and rotated in use at speeds up to 2000 revolutions per minute, the discs are subjected to high centrifugal force, and due to such force and as a result of irregular, rigid particles which may be accidentally picked up between a pair of rollers, the adjacent discs, even though held in plane parallel flat relationship under high compaction, may sometimes become displaced and dislodged in a direction transversely of the roller, with detrimental effects to the roller and its utility.

It is therefore an object of the present invention to include anchoring means tending to prevent displacement of the flexible discs and rigidify the assembly.

To accomplish the foregoing object, I provide relatively thin, rigid, metal anchoring plates on the shaft which carries the flexible, resilient discs in a manner whereby these metal plates become disposed between and embedded within an adjacent pair of discs beneath their peripheral surfaces.

Other objects of the present invention relate to details of construction and arrangement of parts which will be apparent from a consideration of the following specification and accompanying drawings, wherein:

FIG. 1 is a side elevational view of a roller formed in accordance with the present invention, and FIG. 2 is a section on line 2—2 thereof.

FIG. 3 is a section on the line 3—3 of FIG. 2.

FIG. 4 is an edge elevational view of an anchoring plate employed in the roller assembly of FIGS. 1 and 2.

FIG. 5 is a fragmentary, longitudinal, sectional view of a roller similar to that of FIG. 2 but with modified form of anchoring plate.

FIG. 6 is a section on the line 6—6 of FIG. 5.

Referring to the drawings, the reference numeral 10 designates an elongated angular, in this case square shaft having reduced cylindrical ends 11, 11, the shaft body 10 carrying a plurality of fabric-reinforced, flexible, resilient rubber discs 12, each formed with an axial aperture conforming to the contour of the shaft body 10 and axially compressed thereon between the end plates 13, 13 and locked on the shaft body 10 by the pins 14, 14 which extend transversely of and through the shaft body 10.

As shown in FIG. 1, the assembled discs may be formed with helical grooves 15, 16 which may be cut into the laminated flexible discs after assembly, or these grooves can be the result of a pattern formed by the assembly of previously scalloped or peripherally notched discs 12.

In accordance with the present invention and for the purpose of rigidifying and anchoring the flexible fabric-rubber composition discs 12 more securely in place and against displacement in use from the roller body, I provide anchoring plates 17 between some of the discs and not necessarily between all of them. These anchoring plates are composed of relatively thin, rigid metal, and are of a size or diameter less than that of the discs 12.

These metal anchoring plates 17 are formed with axial apertures conforming to the cross-section of the shaft 10 so that they may be retained thereon against rotation in a manner similar to that provided by the apertures in the discs 12 which also conform to the cross-sectional contour of shaft 10. These metal plates 17 are formed with projections or prongs extending normal to their surfaces, peripherally spaced in one or more rows, some of them projecting normal thereto in one direction and others in the opposed direction as at 18 and 19.

Due to the high compaction under which the discs 12 are laminated, the plates 17 become wholly embedded between adjacent discs 12 so that the entire thickness of the plate 17 becomes embedded within an adjacent pair of discs 12. Due to their smaller size or diameter the outer or peripheral edges of the discs 17 become embedded beneath the periphery of the laminated disc roller body portion, as best illustrated in FIG. 2, to better hold the discs 12 in desired position and to rigidify and strengthen the entire assembled roller.

Although FIGS. 1–3 show the employment of a shaft 10 of square, solid cross-section, the shaft may be of other angular section such as right triangular or hexagonal or cylindrical, and instead of being solid it may be hollow, as for example the hollow tube 20 shown in the assembly of FIG. 5. This tube 20 has end closure pieces 21 carrying stud shafts 22 at its opposed ends. A plurality of axially apertured fabric-reinforced, flexible, resilient rubber discs 12, as previously described, are assembled on the shaft 20 in axial compressed relation thereon and held by the end plates 23 by means of locking rings 24 disposed in the annular recess 25 and seated in a peripheral notch in the tube 20.

Although locking plates 17 when formed with a suitable axial aperture may be engaged on the tube 20 and locked in anchoring and reinforcing relationship with the discs 12 thereon, for illustrative purposes FIGS. 5 and 6 show a modified form of anchoring plate 26 formed with surface projections extending alternately and oppositely from the mean plane of plate 26, as at 27 and 28, these alternately opposite integral projections being in the nature of radially extending flutes.

In the alternative, although not shown, it will be understood that these projections 27 and 28 may be angular, separated by radially extending slits and the like, and, in any event, they become embedded under compression between adjacent flexible, resilient discs 12 as shown in FIG. 5. The plates 26, when in the form of discs, are also of a size or diameter smaller than that of the flexible discs 12 so that they terminate beneath the outer surface of the composite roller body.

FIG. 5 also shows means for maintaining the flexible disc 12 and the rigid disc 26 against rotation thereon, this comprising the generally longitudinally extending, radially projecting ribs or key strips 29, 29 welded to the periphery of the tube 20. Although an opposed pair of radially extending ribs 29 are shown, one or more of these may be employed, and the flexible discs 12 and the rigid discs 26 are formed with key slots as at 30 for anchoring reception of the ribs 29.

Although I have shown the preferred embodiments of my invention, various changes in the details may be resorted to without departing from the scope of the appended claims.

I claim:

1. A roller comprising an elongated shaft, a plurality of axially apertured fabric reinforced resilient rubber discs of substantially uniform thickness carried by and secured on said shaft in axially compressed relationship, and a plurality of axially apertured relatively rigid and relatively thin metal anchoring plates carried on said shaft, each disposed between and embedded within an adjacent pair of said discs and beneath their peripheral surfaces, said anchoring plates being formed with a plurality of contiguous radial flutes of arcuate transverse section, adjacent flutes projecting in opposite directions from and outwardly of the mean plane of the plate.

2. A roller comprising an elongated shaft, a plurality of axially apertured fabric reinforced resilient rubber discs of substantially uniform thickness carried by and secured on said shaft in axially compressed relationship, and a plurality of axially apertured relatively rigid and relatively thin metal anchoring plates carried on said shaft, each disposed between and embedded within an adjacent pair of said discs and beneath their peripheral surfaces, said anchoring plates including a plurality of radially fluted unbroken surface portions projecting in opposite directions from the mean plane thereof, said shaft being of circular cross section and including a generally longitudinally extending radially projecting key strip, the apertures of said discs and plates being circular and of a diameter substantially that of said shaft and including key slots for reception of said key strip.

3. A roller comprising an elongated shaft, a plurality of axially apertured fabric reinforced resilient rubber discs of substantially uniform thickness carried by and secured on said shaft in axially compressed relationship, and a plurality of axially apertured relatively rigid and relatively thin metal anchoring plates carried on said shaft, each disposed between and embedded within an adjacent pair of said discs and beneath their peripheral surfaces, said anchoring plates including a plurality of radially fluted rounded unbroken surface portions projecting alternately in opposite directions from the mean plane thereof, said shaft being of angular cross section, the apertures of said discs and plates being of substantially equal angularity and dimension.

References Cited in the file of this patent

UNITED STATES PATENTS

| | | |
|---|---|---|
| 292,958 | Smith | Feb. 5, 1884 |
| 1,080,487 | Shepperd | Dec. 2, 1913 |
| 1,628,835 | Furbush | May 17, 1927 |
| 2,247,874 | Crites | July 1, 1941 |
| 2,324,050 | Shelley | July 13, 1943 |
| 2,737,185 | Siemen | Mar. 6, 1956 |